(12) United States Patent
Sunkara et al.

(10) Patent No.: US 7,342,142 B2
(45) Date of Patent: Mar. 11, 2008

(54) HYDROGENATION OF POLYTRIMETHYLENE ETHER GLYCOL

(75) Inventors: Hari Babu Sunkara, Hockessin, DE (US); Mayis Seapan, Landenberg, PA (US); George Francis Diffendall, Wilmington, DE (US); Francis Glenn Gallagher, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 953 days.

(21) Appl. No.: 10/634,612

(22) Filed: Aug. 5, 2003

(65) Prior Publication Data

US 2004/0225163 A1 Nov. 11, 2004

Related U.S. Application Data

(60) Provisional application No. 60/468,227, filed on May 6, 2003.

(51) Int. Cl.
C07C 29/34 (2006.01)
C07C 29/32 (2006.01)

(52) U.S. Cl. ............... 568/868; 568/869; 568/617; 568/621; 560/248

(58) Field of Classification Search .......... 560/248; 568/868, 869, 617, 621
See application file for complete search history.

(56) References Cited

U.S. PATENT DOCUMENTS

| | | | |
|---|---|---|---|
| 4,213,000 A | 7/1980 | Coates | |
| 4,480,124 A * | 10/1984 | Mueller | 560/248 |
| 4,885,410 A | 12/1989 | De Thomas | |
| 5,015,789 A | 5/1991 | Arntz et al. | |
| 5,171,898 A | 12/1992 | Arntz et al. | |
| 5,276,201 A | 1/1994 | Haas et al. | |
| 5,284,979 A | 2/1994 | Haas et al. | |
| 5,334,778 A | 8/1994 | Haas et al. | |
| 5,364,984 A | 11/1994 | Arntz et al. | |
| 5,364,987 A | 11/1994 | Haas et al. | |
| 5,527,973 A | 6/1996 | Kelsey | |
| 5,962,745 A | 10/1999 | Brossmer et al. | |
| 5,986,145 A | 11/1999 | Powell et al. | |
| 6,111,137 A | 8/2000 | Suizu et al. | |
| 6,140,543 A | 10/2000 | Brossmer et al. | |
| 6,191,321 B1 | 2/2001 | Forschner et al. | |
| 6,232,511 B1 | 5/2001 | Haas et al. | |
| 6,255,442 B1 | 7/2001 | Kurian et al. | |
| 6,281,325 B1 | 8/2001 | Kurian et al. | |
| 6,284,930 B1 | 9/2001 | Haas et al. | |
| 6,297,408 B1 | 10/2001 | Haas et al. | |
| 6,325,945 B2 | 12/2001 | Kurian et al. | |
| 6,331,264 B1 | 12/2001 | Kurian et al. | |
| 6,335,421 B1 | 1/2002 | Kurian et al. | |
| 6,342,464 B1 | 1/2002 | Arhancet et al. | |
| 6,342,646 B1 | 1/2002 | Haas et al. | |
| 6,350,895 B1 | 2/2002 | Kurian | |
| 6,353,062 B1 | 3/2002 | Glardino et al. | |
| 2004/0087819 A1 | 5/2004 | Powell et al. | |
| 2004/0211729 A1 | 10/2004 | Sunkara et al. | |
| 2004/0225161 A1 | 11/2004 | Sunkara et al. | |
| 2004/0225162 A1 | 11/2004 | Sunkara et al. | |
| 2005/0020805 A1 | 1/2005 | Sunkara et al. | |

FOREIGN PATENT DOCUMENTS

WO WO 2004/078392 A1 9/2004

OTHER PUBLICATIONS

International Search Report, date of mailing: Feb. 18, 2005.
Written Opinion of the International Searching Authority, date of mailing: Feb. 18, 2005.

* cited by examiner

*Primary Examiner*—Elvis O. Price

(57) ABSTRACT

A process comprising contacting PO3G having color with hydrogen in the presence of a hydrogenation catalyst, wherein the PO3G, after hydrogenation, has a APHA color of less than about 50.

42 Claims, No Drawings

HYDROGENATION OF POLYTRIMETHYLENE ETHER GLYCOL

PRIORITY

This application claims priority from Provisional U.S. Patent Application Ser. No. 60/468,227, filed May 6, 2003, incorporated herein by reference.

FIELD OF THE INVENTION

This invention relates to removal of color from polyether glycols from the polymerization of 1,3-propanediol, alone or with other glycols, by hydrogenation.

BACKGROUND OF THE INVENTION 1,3-Propanediol (also hereinafter termed "PDO") is a monomer useful in the production of a variety of polymers including polyesters, polyurethanes, polyethers, and cyclic compounds. Homo and copolyethers of polytrimethylene ether glycol (hereinafter termed "PO3G") are examples of such polymers. The polymers are ultimately used in various applications including fibers, films, etc.

Chemical routes to generate 1,3-propanediol are known. For instance, 1,3-propanediol may be prepared from:
1. ethylene oxide over a catalyst in the presence of phosphine, water, carbon monoxide, hydrogen and an acid (the "hydroformylation route");
2. the catalytic solution phase hydration of acrolein followed by reduction (the "acrolein route").

Both of these synthetic routes to 1,3-propanediol involve the intermediate synthesis of 3-hydroxypropionaldehyde (hereinafter also termed "HPA"). The HPA is reduced to PDO in a final catalytic hydrogenation step. Subsequent final purification involves several produced 1,3-propanediol or PDO is, by definition, from renewable resources.

Biochemical routes to 1,3-propanediol have been described that utilize feedstocks produced from biological and renewable resources such as corn feed stock. Such PDO is hereinafter referred to as "biochemical PDO" or "biochemically-derived PDO". For example, bacterial strains able to convert glycerol into 1,3-propanediol are found in e.g., in the species *Klebsiella, Citrobacter, Clostridium*, and *Lactobacillus*. The technique is disclosed in several patents, including, U.S. Pat. Nos. 5,633,362, 5,686,276, and, most recently, U.S. Pat. No. 5,821,092, all of which are incorporated herein by reference. In U.S. Pat. No. 5,821,092, Nagarajan et al., disclose inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E. coli* is grown in the presence of glycerol as a carbon source and 1,3-propanediol is isolated from the growth media. Since both bacteria and yeasts can convert glucose (e.g., corn sugar) or other carbohydrates to glycerol, the process of the invention provided a rapid, inexpensive and environmentally responsible source of 1,3-propanediol monomer useful in the production of polyesters, polyethers, and other polymers.

Precipitations (e.g., with 1,2-propylene glycol, as well as carboxylates or other materials) have been used since the early 1980's to separate the colored and odiferous components from desired products (such as enzymes) to obtain purified preparations. Precipitating the high molecular weight constituents from the fermentor liquors, then bleaching these components with a reducing agent (DE3917645) is known. Alternately, microfiltration followed by nanofiltration to remove the residual compounds has also been found helpful (EP657529) where substances with a high molecular weight above the size of separation are held back. However, nanofiltration membranes become clogged quickly and can be quite expensive.

Various treatment methods are disclosed in the prior art to remove color precursors present in the PDO, however, the methods are laborious, expensive and increase the cost of the polymer. For instance, Kelsey, U.S. Pat. No. 5,527,973, discloses a process for providing a purified 1,3-propanediol that can be used as a starting material for low color polyester. That process has several disadvantages including the use of large equipment and the need for dilution with large quantities of water, which are difficult to remove from the product. Sunkara et al., U.S. Pat. No. 6,235,948, discloses a process for the removal color-forming impurities from 1,3-propanediol by a preheating, preferably with heterogeneous acid catalysts such as perfluorinated ion exchange polymers. The catalyst is filtered off, and the 1,3-propanediol is then isolated, preferably by vacuum distillation. Preparation of polytrimethylene ether glycol from purified diol gave APHA values of 30-40, however, the molecular weight of the polymers were not reported.

The polyalkylene ether glycols are generally prepared by the acid-catalyzed elimination of water from the corresponding alkylene glycol or the acid-catalyzed ring opening of the alkylene oxide. For example, polytrimethylene ether glycol can be prepared by dehydration of 1,3-propanediol or by ring opening polymerization of oxetane using soluble acid catalysts. Methods for making PO3G from the glycol, using sulfuric acid catalyst, are fully described in U.S. Patent Application publication Nos. 2002/0007043A1 and 2002/0010374A1, all of which are incorporated herein by reference. The polyether glycol prepared by the process is purified by the methods known in the art. The purification process for polytrimethylene ether glycol typically comprises (1) a hydrolysis step to hydrolyze the acid esters formed during the polymerization (2) water extraction steps to remove the acid catalyst, unreacted monomer, low molecular weight linear oligomers and oligomers of cyclic ethers, (3) a base treatment, typically with a slurry of calcium hydroxide, to neutralize and precipitate the residual acid present, and (4) drying and filtration of the polymer to remove the residual water and solids.

It is well known that the polytrimethylene ether glycol produced from the acid catalyzed polycondensation of 1,3-propanediol has quality problems, in particular, the color is not acceptable to the industry. The polymer quality is in general dependent on the quality of the raw material, PDO. Besides the raw material, the polymerization process conditions and stability of the polymer are also responsible for discoloration to some extent. Particularly in the case of polytrimethylene ether glycol, the polyether diols tend to have light color, a property that is undesirable in many end-uses. The polytrimethylene ether glycols are easily discolored by contact with oxygen or air, particularly at elevated temperatures, so the polymerization is effected under a nitrogen atmosphere and the polyether diols are stored in the presence of inert gas. As an additional precaution, a small concentration of a suitable antioxidant is added. Preferred is butylated hydroxytoluene (BHT, 2.6-di-t-butyl-4-methylphenol) at a concentration of about 100-500 microg/g (micrograms/gram) polyether.

Also, attempts have been made to reduce the color of polytrimethylene ether glycols by conventional means without much success. For instance, Morris et al., U.S. Pat. No. 2,520,733, notes the peculiar discoloration tendency for the polytrimethylene ether glycol from the polymerization of PDO in the presence of acid catalyst. The many methods they tried that failed to improve the color of polytrimethylene glycols included the use of activated carbons, activated aluminas, silica gels, percolation alone, and hydrogenation alone. Consequently, they developed a process for the purification of polyols prepared from 1,3-propanediol in the presence of acid catalyst (2.5 to 6% by weight) and at a temperature from about 175° C. to 200° C. This purification process involves percolation of the polymer through Fuller's earth followed by hydrogenation. This extensive purification process gave a final product that was light yellow in color, in fact, this procedure yielded polytrimethylene ether glycol (Example XI therein) for which the color was only reduced to an 8 Gardner color, a quality corresponding to an APHA value of >300 and totally inadequate for current requirements.

Mason in U.S. Pat. No. 3,326,985 discloses a procedure for the preparation of polytrimethylene ether glycol of molecular weights in the range of 1200-1400 possessing improved color by vacuum stripping, under nitrogen, polytrimethylene ether glycol of lower molecular weight. The color levels, however, are not quantified and would not have approached the above requirement.

Catalytic hydrogenation is the reaction of a compound with hydrogen in the presence of a catalyst. Hydrogenation has been used to remove color-causing compounds in the production of certain products from wastewater streams of the kraft pulp mill process (Ghoreishi et al., Characterization and Reduction of Chromophores in Pulp Mill Effluents. *Sci. Iran.* 4(3):131-138 (1997)). A variety of substances are poisons for hydrogenation catalysts; the most commonly encountered being mercury, divalent sulfur compounds, and, to a lesser degree, amines (H. O House, *Modern Synthetic Reactions*, Second ed., W. A. Benjamin: Menlo Park, Calif., pp 1-15 (1972)).

SUMMARY OF THE INVENTION

Disclosed is a process comprising contacting PO3G having color with hydrogen in the presence of a hydrogenation catalyst, wherein the PO3G, after hydrogenation, has a APHA color of less than about 50 and a molecular weight of about 250-5,000.

DETAILED DESCRIPTION OF THE INVENTION

Unless otherwise stated, all percentages, parts, ratios, etc., are by weight. Trademarks are shown in upper case.

Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed.

The present invention is directed towards a hydrogenation process for the removal of color from PO3G, either chemical or biochemical. In accordance with a first aspect, a process comprises contacting polytrimethylene ether glycol having color with hydrogen in the presence of a hydrogenation catalyst, wherein the polytrimethylene ether glycol, after hydrogenation, has a APHA color of less than about 50 and a molecular weight of about 250-5000.

By the terms "remove" or "removal", as applied to color, is meant a chemical conversion by hydrogenation. Chemicals that cause color are "removed", i.e., converted into chemicals that are not colored.

By the term "color" is meant the existence of visible color that can be quantified using a spectrocolorimeter in the range of visible light, using wavelengths of approximately 400-800 nm, and by comparison with pure water. The PO3G color quality was measured by a Hunter-quest calorimeter (as described in Test Method 1 below) and as well from a UV/VIS spectrophotometer (as described in Test Method 5 below).

Hydrogenation has been found an effective, economical way to convert these impurities to compounds that are colorless.

Hydrogenation is achieved by contacting the PO3G with hydrogen in the presence of a hydrogenation catalyst. The catalyst is comprised of at least one element of Group VIII of the periodic table. Preferably, the catalyst is at least one of Ni, Co, Ru, Rh, Pd, Ir and Pt, with or without various promoters. Various mixed oxides such as mixed copper, chromium, and zinc oxides are also effective catalysts for color removal. Hydrogenation catalysts are well known in the art and are extensively covered in "*Handbook of Heterogeneous Catalytic Hydrogenation for Organic Synthesis*" by Shigeo Nishimuru, John Wiley (2001).

The catalyst may be a porous metal structure or supported on a substrate. The catalyst support could be from any support material known in the art, such as carbon, alumina, silica, titania, silica-alumina, silica-titania, titania-alumina, clays, aluminosilicates, water insoluble salts of calcium, barium, barium sulfate, calcium carbonate, strontium carbonate, and compounds and combinations thereof. The catalyst may have various shapes or sizes, ranging from a fine powder to granules, tablets, pellets, extrudates, or other structured supports.

The metal catalyst comprises at least one of RANEY nickel and RANEY cobalt catalysts which may or may not be modified with such elements as iron, molybdenum, chromium, palladium, zinc or other modifying elements, or catalysts made as dispersions of these elements, or supported catalysts from the group consisting of palladium on carbon, palladium on calcium carbonate, palladium on barium sulfate, palladium on alumina, palladium on titania, platinum on carbon, platinum on alumina, platinum on silica, iridium on silica, iridium on carbon, iridium on alumina, rhodium on carbon, rhodium on silica, rhodium on alumina, nickel on carbon, nickel on alumina, nickel on silica, rhenium on carbon, rhenium on silica, rhenium on alumina, ruthenium on carbon, ruthenium on alumina, ruthenium on silica, mixed copper and zinc oxides, and mixed copper and chromium oxides. An example of the preferred catalyst is nickel, which may be in the form of a RANEY catalyst or extrudates supported on silica/alumina.

Hydrogenation may be carried out in various gas/liquid/solid-contacting reactors known in the art. These reactors may operate in batch, semi-batch, and flow mode, using suspended or fixed bed catalysts. An industrially advantageous reactor uses a packed bed of catalyst wherein the liquid and gas flow co-currently or counter-currently, in an up-flow or down-flow (trickle-bed) mode of operation.

Hydrogenation temperature affects the conversion of color and color-precursor compounds. Temperatures in the range of about 25°-250° C. can reduce color. Color reduction is faster at higher temperatures. A proper combination of contact time and temperature can achieve a desired color improvement at temperatures as low as about 25° C. While effective color reduction can be achieved in the range of about 25°-250° C., the preferred temperature ranges for PO3G is about 120°-200° C., with a more preferred range of about 140°-180° C. LHSV values (LHSV A proper combination of contact time and temperature can achieve a desired color improvement at temperatures as low as about 25° C. While effective color reduction can be achieved in the range of about 25°-250° C., the preferred temperature ranges for PO3G is about 120°-200° C., with a more preferred range of about 140°-180° C. LHSV values (LHSV=Liquid Hourly Space Velocity, units reciprocal hours, $h^{-1}$) are dependent on the temperature used, and should be maximized. A preferred LHSV is greater than about 0.01 $h^{-1}$. A more preferred LHSV is greater than about 1.0 $h^{-1}$, and a most preferred LHSV is greater than about 10 $h^{-1}$.

Hydrogen consumption is generally very low and depends on the level of impurities present in the crude polyol. Generally, hydrogen consumption is within the range of hydrogen solubility in the crude liquid. With the proper selection of temperature and contact time, adequate conversion can be achieved at slightly above atmospheric pressures. Above this level, an additional increase in pressure has minimal effect on the extent of color removal. Color reductions can be achieved at pressures from about ambient to about 1000 psig (7000 kPa), with about 200-600 psig (1480-4240 kPa) being a preferred range of pressure, and about 300-500 psig (2170-3550 kPa) being the most preferred range of pressure. Psig denotes "pounds per square inch gauge".

The ratio of hydrogen to PO3G feed rate does not have a significant effect on the conversion above the stoichiometric required level of hydrogen. Effective color reductions can be achieved at about 0.05-100 standard $cm^3$ of hydrogen per gram of crude PO3G. The preferred range is about 0.5-2 standard $cm^3$ of hydrogen per gram of crude PO3G, and a more preferred range is about 0.5-1 standard $cm^3$ of hydrogen per gram of crude PO3G.

As noted above, according to one aspect of the present invention, the polytrimethylene ether glycol, after hydrogenation, has an APHA color (measured according to Test Method 1, below) of less than about 50. Preferably, the APHA color, after hydrogenation, is less than about 40, more preferably, less than about 30, and most preferably, less than about UV spectroscopy (according to Test Method 5, below) shows an absorption peak at about 270 nm that, when observed in PDO, strongly correlated with the presence of impurities that could form color during subsequent polymerization and processing. While absorption at 270 nm in PO3G does not contribute to color, it is desirable to minimize absorption at 270 nm and thus, minimize such impurities. The hydrogenation process of the present invention reduces the UV absorption at 270 nm to less than about 1.0, preferably less than about 0.3, and most preferably, less than about 0.15.

According to another aspect of the present invention, the color of the PO3G, after hydrogenation, is reduced by at least about 50%. More preferably, the color is reduced by at least about 60%, most preferably, by at least about 70%.

In accordance with a further aspect of the present invention, a process comprises
(a) contacting 1,3 propanediol reactant having color with hydrogen in the presence of a hydrogenation catalyst,
(b) contacting the hydrogenated 1,3-propanediol with polycondensation catalyst;
(c) polycondensing the 1,3-propanediol reactant to PO3G having color; and
(d) contacting the PO3G with hydrogen in the presence of a hydrogenation catalyst.

Preferably, the 1,3-propanediol is chemical 1,3-propanediol. Preferably, the PO3G, after hydrogenation, has a APHA color of less than about 50. Also preferably, the 1,3 propanediol, after hydrogenation has a APHA color of less than about 10.

According to a further aspect of the present invention, a composition comprises (i) PO3G having color and (ii) hydrogenation catalyst (as already described herein), wherein the PO3G has a APHA color of less than about 50. Preferably, the APHA color is less than about 40, more preferably, less than about 30, most preferably, less than about 20.

The amount of catalyst is, preferably, the minimum amount sufficient to effect the hydrogenation, which is considered to be well within the skill of the art. As is well known to those skilled in the art, the amount of catalyst is affected by the activity of the catalyst and the presence in the composition of chemicals that reduce the activity of, or poison, the catalyst. The amount of catalyst could be as low as about 0.05% of the composition, or 0.01%, or 0.005% or even 0.001% thereof. Preferably, the hydrogenation catalyst is present in an amount not exceeding about 20% of the composition. More preferably, the hydrogenation catalyst is present in an amount not exceeding about 5% of the composition and most preferable, the hydrogenation catalyst is present in an amount not exceeding about 2% of the composition.

The PO3G made from the PDO of the present invention can be PO3G homo- or co-polymer. For example, the PDO can be polymerized with other diols (below) to make co-polymer. The PO3G made from the PDO monomer of the present invention, preferably, has a color value of less than about 50 APHA. More preferably, the PO3G color value is less than about 30 APHA. Preferably, the PO3G products made using the PDO monomer/oligomers of the present invention have a molecular weight of about 250 to about 5000, preferably about 500 to about 4000, and most preferably about 1000 to about 3000.

The PDO copolymers useful in the present invention can contain up to 50% by weight (preferably 20% by weight or less) of comonomer diols in addition to the 1,3-propanediol and/or its oligomers. Comonomer diols that are suitable for use in the process include aliphatic diols, for example, ethylenediol, 1,6-hexanediol, 1,7-heptanediol, 1,8-octanediol, 1,9-nonanediol, 1,10-decanediol, 1,12-dodecanediol, 3,3,4,4,5,5-hexafluro-1,5-pentanediol, 2,2,3,3,4,4,5,5-octafluoro-1,6-hexanediol, 3,3,4,4,5,5,6,6,7,7,8,8,9,9,10,10-hexadecafluoro-1,12-dodecanediol, cycloaliphatic diols, for example, 1,4-cyclohexanediol, 1,4-cyclohexanedimethanol and isosorbide, polyhydroxy compounds, for example, glycerol, trimethylolpropane, and pentaerythritol. A preferred group of comonomer diol is selected from the group consisting of 2-methyl-1,3-propanediol, 2,2-dimethyl-1,3-propanediol, 2,2-diethyl-1,3-propanediol, 2-ethyl-2-(hydroxymethyl)-1,3-propanediol, 1,6-hexanediol, 1,8-octanediol, 1,10-decanediol, isosorbide, and mixtures thereof. Thermal stabilizers, antioxidants and coloring materials may be added to the polymerization mixture or to the final polymer if necessary.

Materials, Equipment, and Test Methods

The PO3G polymer prepared from 1,3-propanediol is either from E. I. du Pont de Nemours and Company (Wilmington, Del.), Aldrich (Milwaukee, Wis.), or from commercial sources.

Test Method 1. Color Measurement

A Hunterlab ColorQuest Spectrocolorimeter (Reston, Va.) was used to measure the PDO and polymer color. Color numbers are measured as APHA values (Platinum-Cobalt System) according to ASTM D-1209. The "b*" color of is calculated from the UV/VIS spectra and computed by the instrument. Color is commonly expressed in terms of Hunter numbers which correspond to the lightness or darkness ("L") of a sample, the color value ("a*") on a red-green scale, and the color value ("b*") on a yellow-blue scale. In the context of this invention, the "b*" color value is preferably near 0.

Test Method 2. MW Determination

The number-average molecular weights of PO3G were calculated from the hydroxyl numbers obtained from by titration (Test Method 4 below).

Test Method 3. Measurement of Unsaturation

Unsaturation in polyether glycols was determined by ASTM D-4671.

Test Method 4. Measurement of OH #

Hydroxyl number was determined according to ASTM E222.

Test Method 5. UV Absorption

The PO3G color quality was measured by a UV/VIS spectrophotometer. Specifically, the broad UV absorption peak at around 270 nm, in the case of PDO, correlates strongly with the presence of impurities that form color during subsequent polymerization and processing. While absorption at 270 nm does not contribute color to PO3G, minimizing the presence of such impurities is desirable. All the UV analyses were measured using a HP 8453 UV/VIS spectrophotometer (Hewlett Packard, Palo Alto, Calif.) at 20% dilution. The PO3G was dissolved in pure methanol and diluted to a 20% by volume solution in pure methanol. The results are reported at 20% dilution. Absorption peaks at about 210, 220, and 242 nm have less correlation with potential color.

EXAMPLES

It should be understood that the following Examples are given by way of illustration only.

General Methods:

The material and methods suitable for hydrogenation are well known in the art. In the Examples that follow, shaker-tube and up-flow fixed bed tubular reactors were used that operated in batch or flow modes using fine powder, granular, and extrudate catalysts.

Example 1

Preparation of PO3G 1,3-Propanediol, 13.9 kg, and 139 g concentrated sulfuric acid were added to a 22-L glass reactor and the contents polymerized at 160° C. under nitrogen until the desired number average molecular weight was reached. In general, longer reaction times give polymers with high

Example 1

Preparation of PO3G 1,3-Propanediol, 13.9 kg, and 139 g concentrated sulfuric acid were added to a 22-L glass reactor and the contents polymerized at 160° C. under nitrogen until the desired number average molecular weight was reached. In general, longer reaction times give polymers with high molecular weight. A portion of the crude polymer (5 kg) and an equal volume of distilled water were transferred to another 22-L glass reactor with and the reaction mixture stirred slowly under a nitrogen blanket while heated to 100° C. for 4 hours. After 4 hours, the mixture was allowed to cool and separate into two phases by gravity. The aqueous phase was removed and discarded. The polymer was washed again with an equal volume of water. The resulting aqueous phase was removed and discarded. The residual sulfuric acid present in the polymer was neutralized with an excess of calcium hydroxide. The polymer was dried under reduced pressure at 90° C. for 3 hours and then filtered through a Whatman filter paper precoated with a CELPURE filter aid. The purified PO3G polymer obtained was analyzed for molecular weight and color.

Examples 2-5

Hydrogenation of PO3G to Reduce Polymer Color

In these examples, PO3G was hydrogenated in a shaker tube with RANEY 2400 Nickel slurry catalyst (Cr and Fe promoted Ni) at the various operating conditions summarized in Table 1. In all cases, 200 g of PO3G were placed in a 400-mL stainless steel shaker tube with the amount of the catalyst shown in Table 1. The shaker tube was purged with nitrogen, heated to the specified temperature, and pressurized with hydrogen to the designated pressure. The reactor was shaken for the specified time, then cooled and depressurized. Table 1 describes the reaction conditions of these experiments.

TABLE 1

Hydrogenation Conditions.

| | | | | | |
|---|---|---|---|---|---|
| 5 | 200 | 5 | 160 | 400 (2860) | 6 |

After the hydrogenation, the polymer samples were filtered to remove the suspended catalyst particles. The catalyst particles were removed easily form the polymer samples (Examples 4 and 5) with a 5 micrometer filter paper, however, the polymer samples (Examples 2 and 3) were centrifuged after filtering through 1 micrometer filter paper to remove catalyst residue. All of the samples were analyzed for UV color (Test Method 5), polymer color (Test Method 1), unsaturation (Test Method 3), and hydroxyl Number (Test Method 4). The UV results are shown in Table 2 and the remaining results are shown in the following Table 3.

TABLE 2

UV Absorption Data of Polymer Samples

| | Wavelength (nm) | | |
|---|---|---|---|
| Example | 210 | 242 | 270 |
| PO3G before hydrogenation | 2.948 | 3.296 | 0.718 |
| 2 | 2.467 | 2.687 | 0.502 |
| 3 | 2.019 | 2.159 | 0.389 |
| 4 | 1.952 | 1.628 | 0.324 |
| 5 | 1.909 | 1.263 | 0.336 |

TABLE 3

PO3G properties before and after hydrogenation.

| Example | Color, (b*, APHA) See Test Method 1 | Unsaturation Meq/kg | Hydroxyl number | Mn |
|---|---|---|---|---|
| Before Hydrogenation | 10.3, 169 | 19 | 59.3 | 1823 |
| 2 | 9.2, 153 | ND | 61.1 | 1835 |
| 3 | 7.9, 131 | ND | 59.6 | 1882 |
| 4 | 6.6, 107 | ND | 53.9 | 2080 |
| 5 | 5.4, 89 | ND | 59.4 | 1889 |

The sample from Example 5 showed significant improvement in the UV spectra and the polymer color was decreased from 169 to 89 APHA units.

All of the unsaturated end groups are hydrogenated (Test Method 3 can only measure unsaturation in polyether polyols down to 3 meq/kg). There are no peaks associated with vinyl groups in the NMR spectra).

It appears the hydrogenation of unsaturated end groups is faster than the hydrogenation of carbonyls as evidenced by the sample from Example 2; there is no significant change in polymer color for Example 2 in spite of complete hydrogenation of unsaturated end groups.

There were no significant changes in hydroxyl numbers of the polymer except for Example 4.

Example 6

In this example, PO3G was hydrogenated in a packed bed catalytic reactor with an extruded catalyst (Sud-Chemie C-28-CDS) containing nominally 60% Ni on alumina/silica.

About 20 g of catalyst was packed in a tubular reactor of 17.3 mm internal diameter and 129 mm length between two layers of inert glass beads. The catalyst was activated by flowing 0.44 g/min of PDO and 10 standard cm$^3$ per minute of hydrogen at 400 psig (2860 kPA). The catalyst activation is carried out for 1 h at 80° C., 1 h at 100° C., and 22 h at 120° C. The effect of hydrogenation on PO3G was then measured at a liquid hourly space velocity of 0.55 h$^{-1}$ and H2 flow rate of 5 standard cm$^3$ at 400 psig (2860 kPa). Hydrogenation clearly improved the visual color of the PO3G and its UV absorption at 270 nm (Test Methods 1 and 5). The UV spectra of PO3G and its hydrogenated products have two main peaks at 220 and 270 nm. Hydrogenation specifically improved the UV-270 nm absorption as shown in the following Table 4.

TABLE 4

| | UV-220 | UV-270 | Color, APHA |
|---|---|---|---|
| Before Hydrogenation | 1.02 | 0.45 | 79 |
| After Hydrogenation, 160 C. | 0.92 | 0.11 | 37 |

What is claimed is:

1. A process comprising contacting PO3G having color with hydrogen in the presence of a hydrogenation catalyst, wherein the PO3G, after hydrogenation, has a APHA color of less than about 50 and a molecular weight of about 250-5,000.

2. The process of claim 1, wherein the PO3G, after hydrogenation, has an APHA color of less than about 40.

3. The process of claim 1, wherein the PO3G, after hydrogenation, has an APHA color of less than about 30.

4. The process of claim 1, wherein the PO3G, after hydrogenation, has an APHA color of less than about 20.

5. The process of claim 1, wherein the catalyst comprises an element of Group VIII of the Periodic Table or a metal oxide.

6. The process of claim 5, wherein the hydrogenation catalyst is supported on a support comprised of at least one of carbon, alumina, silica, silica-alumina, copper chromate, silica-titania, titanla, titania-alumina, barium sulfate, calcium carbonate, strontium carbonate, compounds thereof, and combinations thereof.

7. The process of claim 1, wherein the catalyst comprises at least one of RANEY nickel and RANEY cobalt catalysts which may or may not be modified with such elements as iron, molybdenum, chromium, palladium, zinc or other modifying elements, or catalysts made as dispersions of these elements, or supported catalyate from the group consisting of palladium on carbon, palladium on calcium carbonate, palladium on barium sulfate, palladium on alumina, palladium on titania, platinum on carbon, platinum on alumina, platinum on silica, iridium on silica, Iridium on carbon, iridium on alumina, rhodium on carbon, rhodium on silica, rhodium on alumina, nickel on carbon, nickel on alumina, nickel on silica, rhenium on carbon, rhenium on silica, rhenium on alumina, ruthenium on carbon, ruthenium on alumina, ruthenium on silica, mixed copper oxide, zinc oxides, and chromium oxides.

8. The process of claim 1, wherein the contacting is conducted at a temperature of about 25°-250° C.

9. The process of claim 8, wherein the contacting is conducted at a temperature of about 120°-200° C.

10. The proces of claim 9, wherein the contacting is conducted at a temperature of about 140°-180° C.

11. The process of claim 8, wherein the LHSV is at greater than about 0.01 h$^{-1}$.

12. The process of claim 11, wherein the LHSV is greater than about 1.0 h$^{-1}$.

13. The process of claim 12, wherein the LHSV is greater than about 10 h$^{-1}$.

14. The process of claim 11, wherein the contacting is conducted at a pressure of about ambient to about 1000 psig (7000 kPa).

15. The process of claim 14, wherein the contacting is conducted at a pressure of about 200 to about 600 psig (1480-4240 kPa).

16. The process of claim 15, wherein the contacting is conducted at a pressure of about 300-500psig.

17. The process of claim 14, wherein the amount of hydrogen contacted with the PO3G is from about 0.05 to about 100 standard cm$^3$ per gram of PO3G.

18. The process of claim 17, wherein the amount of hydrogen is from about 0.5 to about 2 standard cm$^3$ per gram of PO3G.

19. The process of claim 17, wherein the amount of hydrogen is from about 0.5 to about 1 standard cm$^3$ per gram of PO3G.

20. The process of claim 1, wherein the PO3G has an APHA color, before the contacting, of at least 50 APHA.

21. The process of claim 20, wherein the APHA color, before the contacting is about 70-300.

22. The process of claim 21, wherein the APHA color, before the contacting, is about 85-250.

23. The process of claim 22, wherein the APHA color, before the contacting, is about 100-200.

24. The process of claim 1, wherein the APHA color is reduced by at least about 50%.

25. The process of claim 1, wherein the APHA color is reduced by at least about 60%.

26. The process of claim 1, wherein the APHA color is reduced by at least about 70%.

27. The process of claim 1, wherein the PO3G, after hydrogenation, has a molecular weight of about 500-4000.

28. The process of claim 27, wherein the molecular weight is about 1000-3000.

29. The process of claim 1, wherein the PO3G, after hydrogenation, has a UV absorption at 270 nm of less than about 1.0.

30. The process of claim 1, wherein the PO3G, after hydrogenation, has a UV absorption at 270 nm of less than about 0.3.

31. The process of claim 1, wherein the PO3G, after hydrogenation, has a UV absorption at 270 nm of less than about 0.15.

32. A process comprising:
(a) contacting 1,3 propanediol reactant having color with hydrogen in the presence of a hydrogenation catalyst;
(b) contacting The hydrogenated 1,3-propanediol with polycondensation catalyst;
(c) polycondensing the 1,3-propanediol reactant to PO3G having color; and
(d) contacting the PO3G with hydrogen in the presence of a hydrogenation catalyst.

33. The process of claim 32, wherein the PO3G, after hydrogenation, has an APHA color of less than about 50.

34. The process of claim 33, wherein the color of the 1,3-propanediol, after hydrogenation, is less than about 10 APHA.

35. A composition comprising: (i) PO3G having color and (ii) hydrogenation catalyst, wherein the PO3G has an APHA color of less than about 50.

36. The composition of claim 35, wherein the PO3G has an APHA color of less than about 40.

37. The composition of claim 35, wherein the PO3G has an APHA color of less than about 30.

38. The composition of claim 35, wherein the PO3G has an APHA color of less than about 20.

39. The composition of claim 35, wherein the catalyst comprises an element of Group VIII of the Periodic Table or a metal oxide.

40. The composition of claim 39, wherein the catalyst is at least one of carbon, alumina, silica, silica-alumina, silica-titania, titania, titania-alumina, barium sulfate, calcium carbonate, strontium carbonate, compounds thereof and combinations thereof.

41. The composition of claim 40, wherein the catalyst comprises at least one of comprises at least one of RANEY nickel and RANEY cobalt catalysts which may or may not be modified with such elements as iron, molybdenum, chromium, palladium, zinc or other modifying elements, or catalysts made as dispersions of these elements, or supported catalysts from the group consisting of palladium on carbon, palladium on calcium carbonate, palladium on barium sulfate, palladium on alumina, palladium on titania, platinum on carbon, platinum on alumina, platinum on silica, iridium on silica, iridium on carbon, iridium on alumina, rhodium on carbon, rhodium on silica, rhodium on alumina, nickel on carbon, nickel on alumina, nickel on silica, rhenium on carbon, rhenium on silica, rhenium on alumina, ruthenium on carbon, ruthenium on alumina, ruthenium on silica, mixed copper oxide, zinc oxides, and chromium oxides.

42. The composition of claim 35, containing about 2-20% catalyst.

* * * * *